United States Patent
Montero et al.

(10) Patent No.: US 12,542,786 B2
(45) Date of Patent: Feb. 3, 2026

(54) SYSTEMS AND METHODS FOR MANAGING OPERATIONS OF DATA PROCESSING SYSTEMS BASED ON GEOLOCATION TRACKING

(71) Applicant: Dell Products L.P., Round Rock, TX (US)

(72) Inventors: Adolfo Sandor Montero, Pflugerville, TX (US); Abeye Teshome, Austin, TX (US); Richard M. Tonry, Georgetown, TX (US); Bassem El-Azzami, Austin, TX (US); Mohit Arora, Frisco, TX (US); Vinodkumar Vasudev Ottar, McKinney, TX (US); Luis Antonio Valencia Reyes, Pflugerville, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 31 days.

(21) Appl. No.: 18/649,178

(22) Filed: Apr. 29, 2024

(65) Prior Publication Data

US 2025/0337749 A1 Oct. 30, 2025

(51) Int. Cl.
*H04L 9/40* (2022.01)
*G06F 21/00* (2013.01)

(52) U.S. Cl.
CPC .................................. *H04L 63/107* (2013.01)

(58) Field of Classification Search
CPC ..... H04L 63/107; H04L 63/10; H04L 63/105; H04L 63/108; G06F 21/60; G06F 21/604; G06F 21/62; G06F 21/629
See application file for complete search history.

(56) References Cited

U.S. PATENT DOCUMENTS

| | | | |
|---|---|---|---|
| 8,042,182 B2 | 10/2011 | Milani Comparetti et al. |
| 8,615,785 B2 | 12/2013 | Elrod et al. |
| 8,924,620 B2 | 12/2014 | Harriman et al. |
| 9,215,244 B2 | 12/2015 | Ayyagari et al. |
| 9,734,169 B2 | 8/2017 | Redlich et al. |
| 9,843,624 B1 | 12/2017 | Taaghol |
| 9,985,847 B2 | 5/2018 | Tung |

(Continued)

OTHER PUBLICATIONS

Santos et al., "gym-hpa: Efficient Auto-Scaling via Reinforcement Learning for Complex Microservice-based Applications in Kubernetes", May 8, 2023, IEEE, NOMA 2023-2023 IEEE/IFIP Network Operations and Management Symposium (2023, pp. 1-9, 9 pages).

*Primary Examiner* — Edward Zee
(74) *Attorney, Agent, or Firm* — WOMBLE BOND DICKINSON (US) LLP

(57) ABSTRACT

Methods and systems for managing operation of a data processing system are disclosed. To manage operation of the data processing system, a management controller of the data processing system may obtain location data for the data processing system and trusted device(s) using an out-of-band communication channel and determine a distance between the data processing system and trusted device(s). Based on the determined distance, the management controller may identify a security policy that may regulate operation of the data processing system by performing an action set to update operations of the data processing system.

20 Claims, 7 Drawing Sheets

(56) References Cited

U.S. PATENT DOCUMENTS

| | | |
|---|---|---|
| 9,990,382 B1 | 6/2018 | Dias |
| 10,176,308 B2 | 1/2019 | Mintz et al. |
| 10,298,670 B2 | 5/2019 | Ben-Shael et al. |
| 10,671,765 B2 | 6/2020 | Swierk et al. |
| 11,036,902 B2 | 6/2021 | Nicholas |
| 11,102,122 B2 | 8/2021 | Seed et al. |
| 11,134,380 B2 | 9/2021 | Fox et al. |
| 11,487,274 B2 | 11/2022 | Valder et al. |
| 11,792,267 B2 | 10/2023 | Kreiner et al. |
| 12,068,958 B1 | 8/2024 | Henkel |
| 2007/0180528 A1 | 8/2007 | Kane |
| 2011/0087387 A1 | 4/2011 | Safa-Bakhsh et al. |
| 2011/0173326 A1 | 7/2011 | Lambert |
| 2013/0290708 A1 | 10/2013 | Diaz |
| 2013/0324081 A1* | 12/2013 | Gargi ............... G06F 21/35 455/411 |
| 2017/0230179 A1 | 8/2017 | Mannan |
| 2018/0039946 A1 | 2/2018 | Bolte et al. |
| 2018/0260342 A1 | 9/2018 | Thangaraj |
| 2019/0188368 A1* | 6/2019 | Hastings ............ H04L 63/0492 |
| 2021/0034048 A1 | 2/2021 | Hajizadeh |
| 2021/0073211 A1 | 3/2021 | Wright, Sr. |
| 2021/0357255 A1 | 11/2021 | Mahadik |
| 2021/0385159 A1 | 12/2021 | Memedagic |
| 2022/0038659 A1 | 2/2022 | Michel |
| 2022/0121511 A1 | 4/2022 | Fredette |
| 2022/0207193 A1 | 6/2022 | Caraccio |
| 2023/0199868 A1 | 6/2023 | Kedalagudde |

* cited by examiner

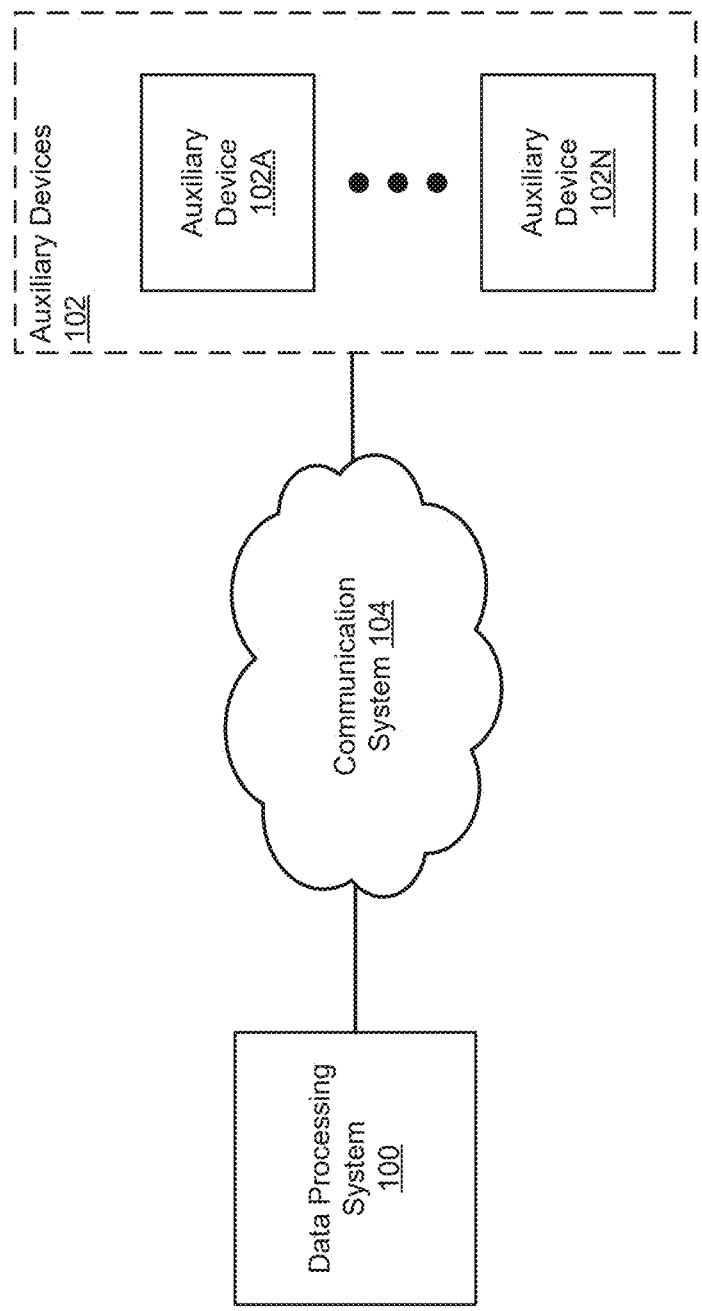

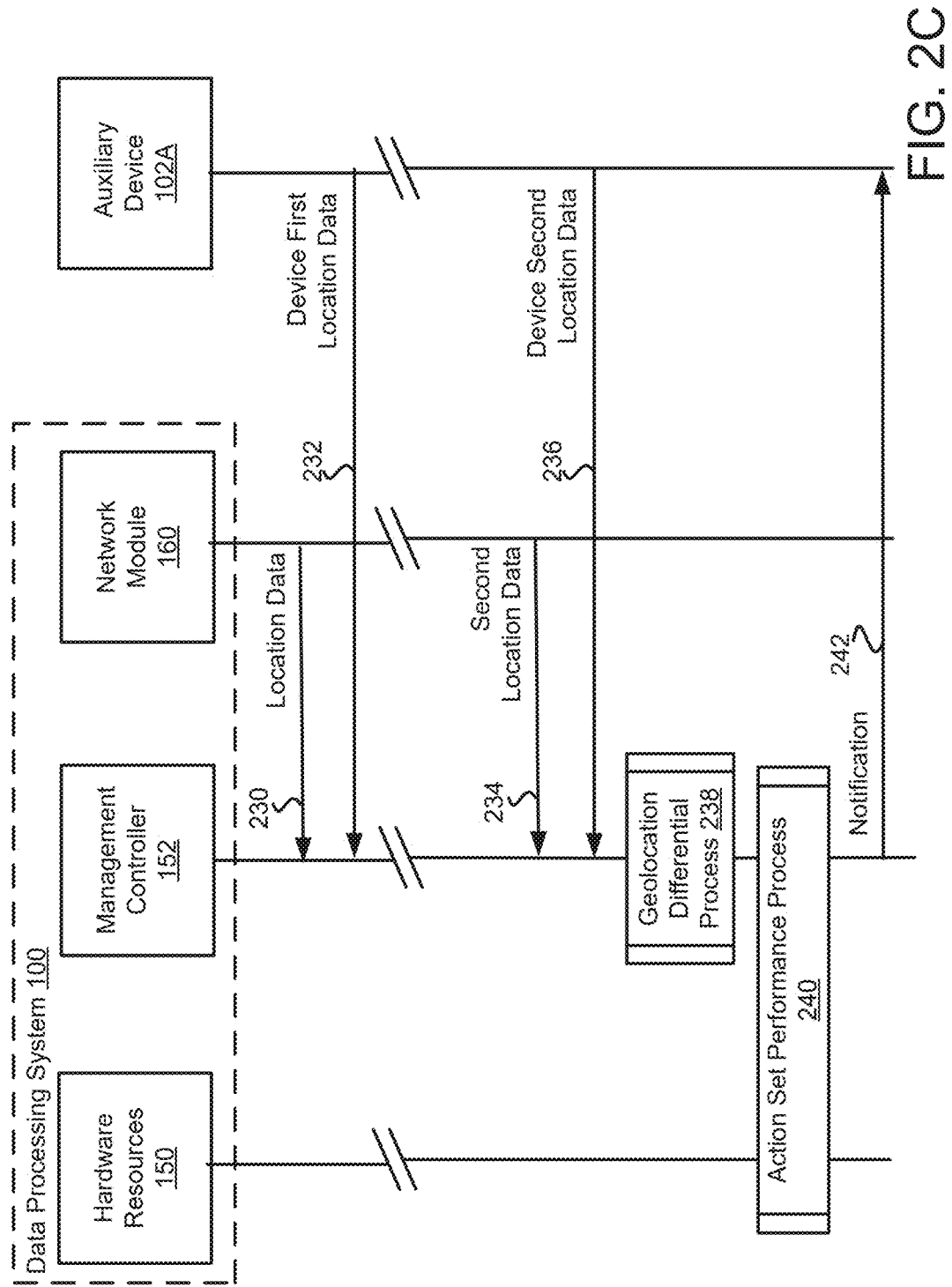

SYSTEMS AND METHODS FOR MANAGING OPERATIONS OF DATA PROCESSING SYSTEMS BASED ON GEOLOCATION TRACKING

FIELD

Embodiments disclosed herein relate generally to managing a data processing system. More particularly, embodiments disclosed herein relate to systems and methods for managing operations of data processing systems based on at least obtaining location data for data processing systems and trusted devices using a management controller of data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1A shows a block diagram illustrating a system in accordance with an embodiment.

FIGS. 2A, 2B, and 2C show data flow diagrams illustrating data flows in accordance with an embodiment.

DETAILED DESCRIPTION

Figure 1B:
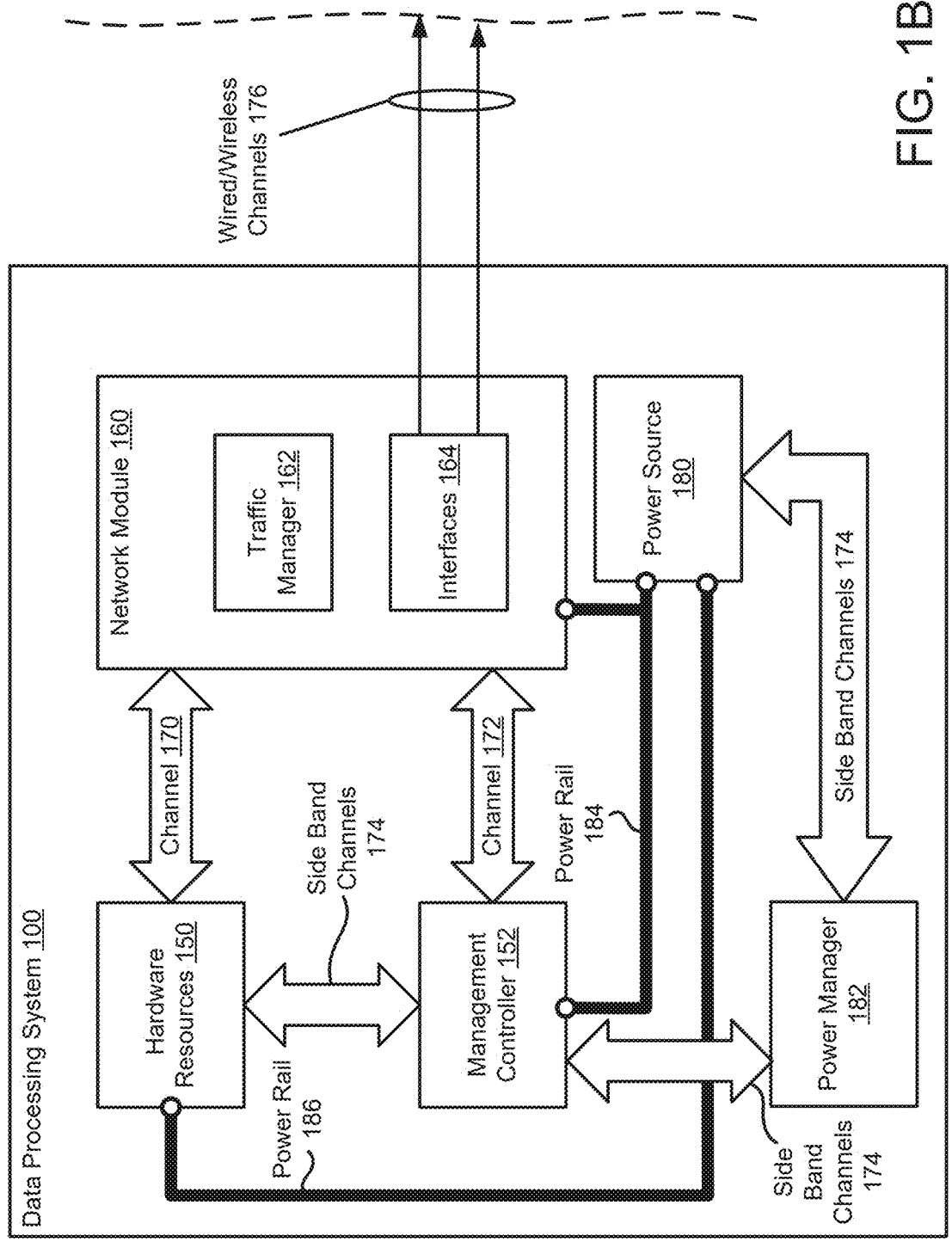
FIG. 1B shows a second block diagram illustrating a data processing system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing (operation of) data processing systems. The data processing systems may provide computer-implemented services. To provide computer-implemented services, restrictions for access to and/or operation of data processing systems may be implemented for security purposes. To implement restrictions for access and/or use of data processing systems by specific users, security credentials for authorized users of data processing systems may be required before access and/or operation of the data processing systems is allowed. For example, a data processing system may require entry of security credentials such as a username and password for a user that is authorized to access and/or operate the data processing system. Following the entry of the security credentials by the user, operation of the data processing system may be enabled.

Implementing access restrictions based on security credentials may pose a security threat if the security credentials for authorized users become known by unauthorized users (e.g., malicious party). For example, if security credentials (e.g., user login and password) for the authorized user become accessible by an unauthorized user, the unauthorized user may gain complete access to and/or operation of the data processing system after entering the security credentials.

In order to decrease the likelihood of unauthorized access to and/or operation of data processing systems, a second form of authorization (e.g., for access and/or operation) for data processing systems may be required to enable use or operation of data processing systems by a user. The second form of authorization may include an additional authorization information, an ancillary device, etc. that provides a user with access to a data processing system when used in combination with security credentials. For example, an ancillary device, such as a universal serial bus "USB", may be a dedicated authentication device and may be inserted into a USB port of the data processing system in order to partially gain access to operations of the data processing system (e.g., in addition to entry of security credentials). Requiring a secondary device to physically plug into a data processing system in order to gain authorization to operate the data processing system may cause unwanted time delays and may cause interruptions in providing computer-implemented services if the secondary device is not physically present with the user operating the data processing system.

To reduce delays and undesirable interruptions during implementation of security procedures for operation of a data processing system, sliding scale restrictions for operation of the data processing system may be implemented by management controller of the data processing based on proximity of an authorized auxiliary device to the data processing system. For example, management controller may implement security policies indicating an increased level of restrictions on the operation of a data processing system based on a function of an increased distance between the data processing system and the authorized auxiliary device.

The management controller may operate independently from hardware resources of the data processing system (e.g., via a separate power sources and a separate network endpoint from the hardware resources) and may be distinct from the hardware resources. Therefore, the management controller may update operation of a data processing system based on a security policy corresponding to a distance between the data processing system and the auxiliary device regardless of a status (e.g., powered on or powered off) of one or more in-band components (e.g., the hardware resources). For example, the management controller may obtain location data for the data processing system and the auxiliary device to determine a distance between the data processing system and the auxiliary device without utilizing the hardware resources of the data processing system.

By doing so, embodiments disclosed herein may provide a system for managing (operation of) a data processing system based on security policies corresponding to a distance between the data processing system and an authorized auxiliary device. The security policies may be implemented in a seamless manner to update operations of the data processing system. Thereby, decreasing the likelihood of unauthorized access to and/or operation of the data processing system and providing a seamless implementation of security policies to update operations of the data processing system based on a likelihood of unauthorized operation of the data processing system by a malicious entity. Once the security policy is implemented (e.g., action set to update operation of the data processing system defined by the security policy), a likelihood that the data processing system may provide more desirable computer-implemented services (e.g., secured, uninterrupted, etc.) may be increased.

In an embodiment, a method for managing operation of a data processing system is provided. The method may include obtaining, by a management controller of the data processing system and via an out-of-band channel, first location data for the data processing system; obtaining, by the management controller and via the out-of-band channel, second location data for an auxiliary device; obtaining, by the management controller, a distance between the data processing system and the auxiliary device using the first location data and the second location data; identifying, by the management controller, a security policy of security policies that regulate the operation of the data processing system, the security policy being identified based at least in part on the distance; and performing, by at least the management controller, an action set specified by the security policy to update operations of the data processing system.

The security policies may indicate increasing levels of restriction on the operation of the data processing system as a function of the distance.

Each of the security policies may define a threshold for comparison to the distance that when met indicates that the data processing system is subject to the security policy.

The action set may include: obscuring at least a portion of information displayed on a display by the data processing system to prevent unauthorized access to the portion of the information.

The action set may also include: initiating a system level lock to user access of the data processing system, the system level lock may require that a user re-enter at least a portion of previously provided security information to regain use of the data processing system.

The action set may also include: at least temporarily suspending operation of the data processing system.

The method may further include: obtaining third location data for a third device, the third device being a trusted device by the data processing system, wherein the identified security policy is keyed to both the distance and the third location data.

The action set may also include: issuing, by the data processing system, a security alert for the third device.

The first location data, the second location data, and the third location data may be provided to the management controller by a network module of the data processing system via the out-of-band communication channel.

The network module may be adapted to separately advertise network endpoints for the management controller and hardware resources of the data processing system, the network endpoints being usable by a server to address communications to the hardware resources using an in-band communication channel and the management controller using the out-of-band communication channel.

The management controller and the network module may be on separate power domains from the hardware resources so that the management controller and the network module may be operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide for management of data processing systems that may provide, at least in part, computer-implemented services. The system may include any number of data processing system 100 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time. Refer to FIG. 1B for additional details regarding data processing system 100.

Operation of and/or computer-implemented services provided by a data processing system (e.g., data processing system 100) may be negatively impacted if any unauthorized users obtain access (e.g., operation of) the data processing system. For example, data processing system 100 may store sensitive data for a user (e.g., authorized user) of data processing system 100 and any unauthorized access (e.g., by a malicious entity) to the sensitive data may be disadvantageous for the user (e.g., inadvertent disclosure of the sensitive data by the malicious entity).

To limit unauthorized access to and/or operation of a data processing system, a form of authentication may be required prior to granting access to operation of the data processing system. For example, entry of security credentials (e.g., user login and password) for an authorized user may be required prior to granting access to and/or operation of data processing system 100 (e.g., during start-up operation of the data processing system). However, the form of authentication may become an ineffective security measure if, for example, the authentication information is inadvertently disclosed to unauthorized users. For example, if the login and password information for an authorized user is obtained by an unauthorized user, the unauthorized user may input the login and password information to obtain access to and operation of data processing system 100.

An additional form of authentication may be implemented (before access and/or operation of a data processing system is granted) in order to further decrease the likelihood that the data processing system may be accessed and/or operated by an unauthorized user. The additional form of authentication (e.g., a second form of authentication) may include a physical authentication device, for example, an external hardware component (e.g., universal serial bus "USB" or other portable device) that provides a second form of authentication when plugged into the data processing system (e.g., by providing a secret or encryption key associated with the data processing system). For example, data processing system 100 may require a user to physically insert a second factor USB key into a USB port of data processing system 100 and enter the user's login credentials (e.g., login user identification and password) in order to allow access to and/or operation of data processing system 100.

However, these forms of authentication may be unreliable and/or ineffective, which may increase a likelihood of potential compromise of and/or unauthorized access to the data processing system. For example, the above-described forms of authentication may be unreliable and/or ineffective if (i) the security credentials for an authorized user become compromised (e.g., unintentionally, or intentionally by a malicious party), (ii) the physical authentication device is damaged, stolen, lost, etc., and/or (iii) the data processing system is intercepted (e.g., physically obtained) by an unauthorized user after both forms of authentication have been verified (e.g., physical authentication device is inserted into the data processing system and the security credentials are entered by a user).

In general, embodiments disclosed herein may provide methods, systems, and/or devices for managing operation of a data processing system. To manage operation of the data processing system, a system in accordance with an embodiment may provide a multi-seamless, multi-authentication experience for users (of the data processing system) with sliding scale restrictions on operation of the data processing system. The data processing system may include out-of-band components that may communicate with one another without traversing in-band communication channels and without utilizing in-band components. For example, the out-of-band components may utilize location data for the data processing system (e.g., 100) and trusted device(s) (e.g., auxiliary devices 102) to determine a distance between the data processing system and the trusted device(s) and identify a security policy that regulates the operation of the data processing system according to the determine distance.

By doing so, the level of restrictions on the operations of the data processing system may be increased while the proximity of the trusted device(s) to the data processing system decreases, thereby decreasing the likelihood of the data processing system becoming compromised (e.g., unauthorized access and/or operation of the data processing system) and/or increasing the likelihood of the data processing system providing desirable computer-implemented services to a user (e.g., authorized access to and/or operation of the data processing system).

Therefore, out-of-band components may be used to implement security policies for a data processing system (e.g., 100) according to the proximity of trusted device(s) to data processing system 100. To do so, location data for the data processing system and the trusted device(s) may be obtained and the location data may be analyzed to determine a distance between the data processing system and the trusted device(s).

The determined distance may be utilized by the out-of-band components to determine which of the security policies for the data processing system to implement, each of the security policies defining a threshold for comparison to the determined distance. If the determined distance between the data processing system and the trusted device(s) is within the threshold of a security policy, the out-of-band components of data processing system 100 may update operation of data processing system 100 as specified by the security policy.

To perform the above-mentioned functionality, the system of FIG. 1A may include data processing system 100, and/or auxiliary devices 102. Data processing system 100, auxiliary devices 102, and/or any other type of devices not shown in FIG. 1A may perform all, or a portion of the computer-implemented services independently and/or cooperatively. Each of these components is discussed below.

Data processing system 100 may include any number and/or type of data processing systems (e.g., other data processing systems, management systems, storage devices, user devices, etc.) that may provide computer-implemented services, based at least in part on security policies corresponding to a physical proximity of data processing system 100 to a trusted device (e.g., auxiliary device 102A). To do so, data processing system 100 may include out-of-band components (e.g., a network module, a management controller, etc.), and functionality that may allow data exchange between the out-of-band components independently from in-band components of data processing system 100. For more information regarding out-of-band components of data processing system 100, refer to the discussion of FIG. 1B.

For example, the out-of-band components of data processing system 100 may (i) obtain first location data for data processing system 100, (ii) obtain second location for an auxiliary device, (iii) obtain a distance between the data processing system and the auxiliary device using the first location data and the second location data, (iv) identify a security policy of security policies that regulate the operation of the data processing system, (v) perform an action set specified by the security policy to update operations of the data processing system, and/or (vi) perform other actions relating to managing operation of the data processing system.

Auxiliary devices 102 may include any number and/or type of auxiliary devices (e.g., 102A-102N) that may provide computer-implemented services, such as authentication services based on their physical location. To perform its functionality, auxiliary devices 102 may communicate (e.g., exchange data) with the out-of-band components of data processing system 100 using out-of-band communication channels. For example, auxiliary device 102A may provide authentication security services for data processing system 100 via a management controller of data processing system 100 (e.g., bypassing any in-band components of data processing system 100).

Figure 2A:
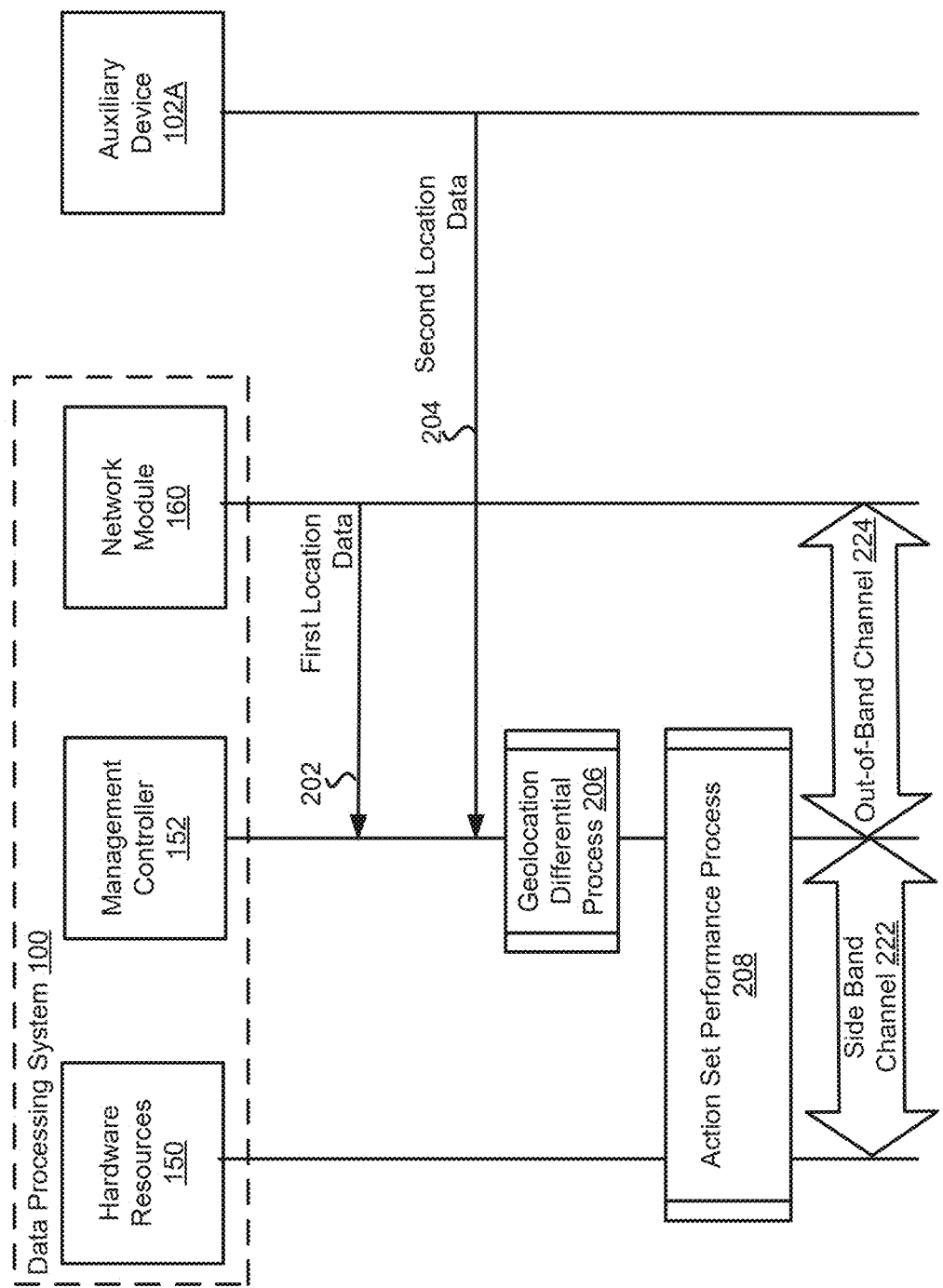
Figure 2B:
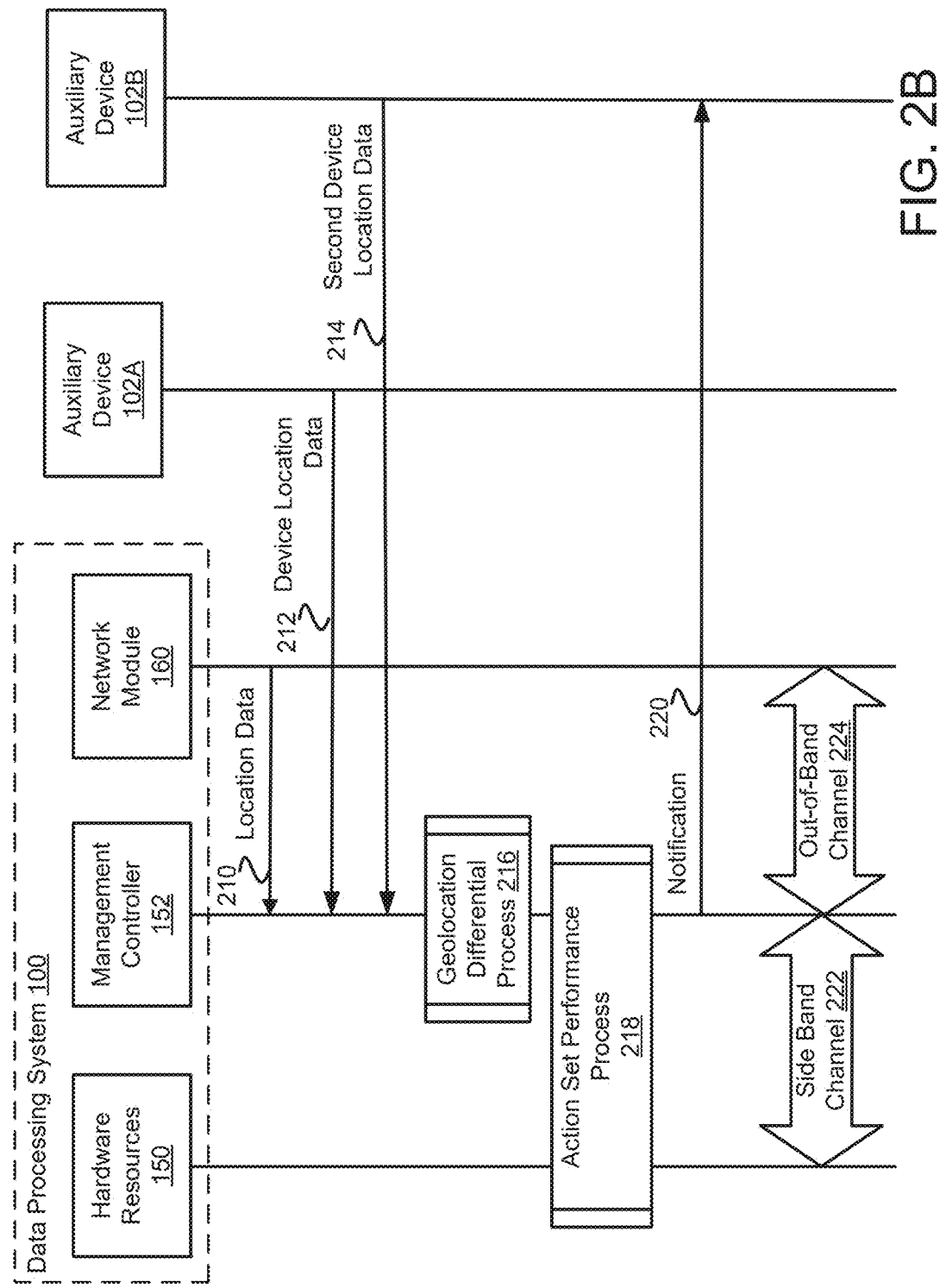

To provide authentication security services, auxiliary devices 102 may, for example, (i) provide location data to the management controller (e.g., via out-of-band communication channels), (ii) participate in authentication processes (e.g., in order to verify authenticity of devices such as data processing system 100), (iii) receive notifications from data processing system 100 (e.g., secured notifications from management controllers via out-of-band communication channels), and/or (iv) perform other actions that may facilitate authentication security services for operation of data processing system 100. Refer to FIGS. 2A-2C for additional information regarding providing authentication services for a data processing system.

Thus, the operation of data processing system 100 may be managed according to proximity of auxiliary devices 102 to data processing system 100 using out-of-band methods (e.g., using out-of-band components and via out-of-band communication channels). By doing so, restrictions on the operations of data processing system 100 may be more likely to be implemented in a timely and seamless manner, unauthorized access and/or operation of data processing system 100 may be more likely managed in a timely manner, and/or data processing system 100 may be more likely to provide the desired computer-implemented services.

Figure 3:
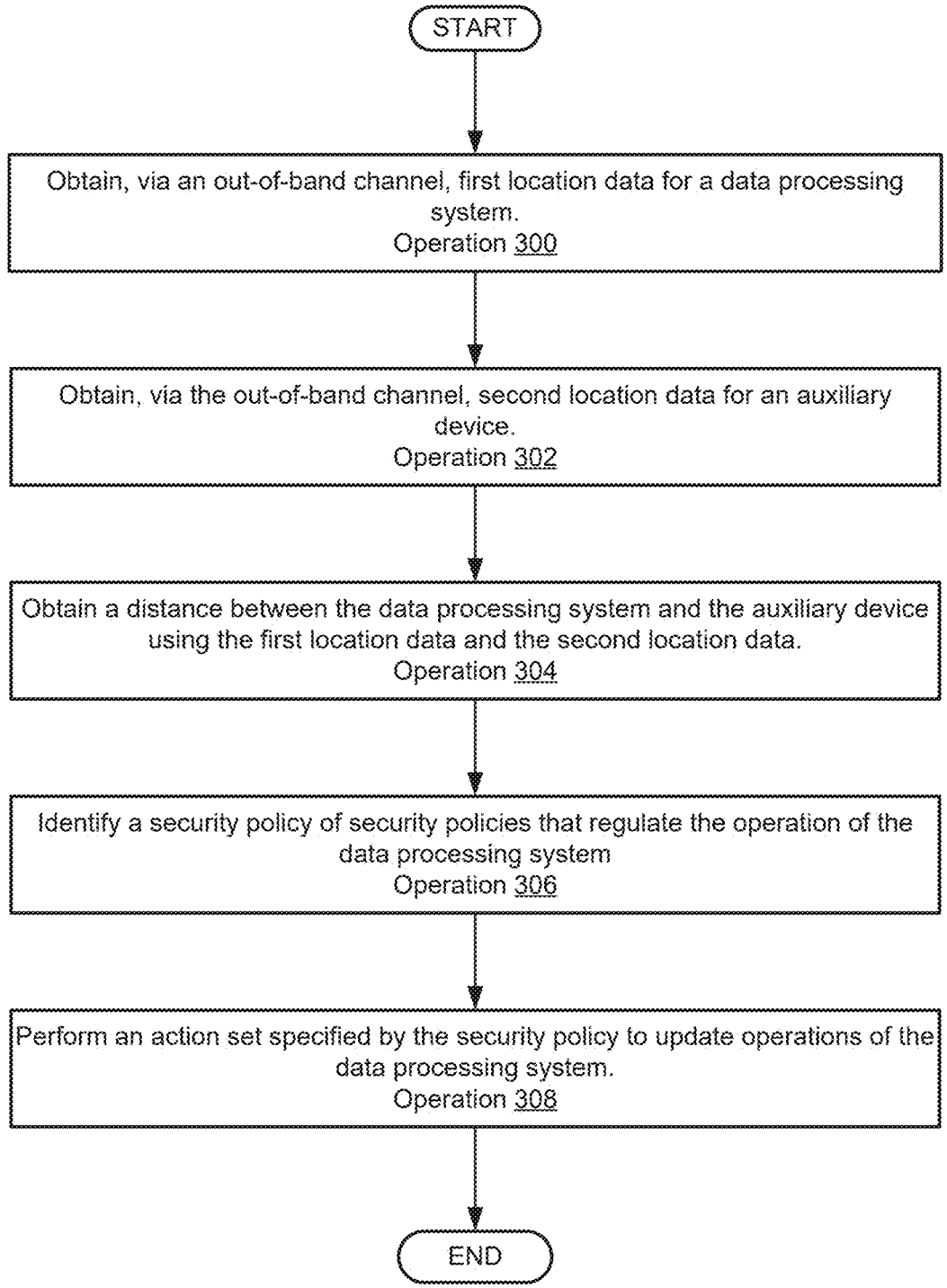
FIG. 3 shows a flow diagram illustrating a method of managing a data processing system in accordance with an embodiment.

When providing their functionality, any of data processing system 100 and/or auxiliary devices 102 may perform all, or a portion of the methods shown in FIG. 3.

Any of (and/or components thereof) data processing system 100 and/or auxiliary devices 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of data processing system 100 and/or auxiliary devices 102 are implemented using an internet of things (IoT) device, which may include a computing device. The IoT device may operate in accordance with a communication model and/or management model known to data processing system 100, auxiliary devices 102, and/or other devices.

Any of the components illustrated in FIG. 1A may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and/or types of communication protocols (e.g., such as the internet protocol). Communication system 104 may include any number of in-band communication channel and/or out-of-band communication channels.

While illustrated in FIG. 1A as including a limited number of specific components, a system in accordance with an embodiment may include fewer, additional, and/or different components than those illustrated therein. For example, while the system of FIG. 1A shows a single data processing system (e.g., 100), it will be appreciated that the system may include any number of data processing systems.

Turning to FIG. 1B, a diagram illustrating data processing system 100 in accordance with an embodiment is shown. Data processing system 100 may be similar to any of data processing systems 100 shown in FIG. 1A.

To provide computer-implemented services, data processing system 100 may include any quantity of hardware resources 150. Hardware resources 150 may be in-band hardware components, and may include a processor operably coupled to memory, storage, and/or other hardware components. Hardware resources 150 may (e.g., via the processor) provide the computer-implemented services desired by users of data processing system 100.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. Additionally, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 100A) to another device via any number of intermediate networks (e.g., via wired/wireless channels 176 that are part of the networks).

To reduce the likelihood of the applications and/or other in-band entities from being indirectly compromised, data processing system 100A may include management controller 152 and network module 160. Each of these components of data processing system 100A is discussed below.

Management controller 152 may operate independently from hardware resources 150 and, therefore, hardware resources 150 may not host and/or manage operation of management controller 152. In addition, management controller 152 may be distinct from hardware resources 150 and, therefore, may be physically separate from hardware resources 150. Management controller 152 may also be operably connected to communication components of data processing system 100A via separate channels (e.g., 172) from the in-band components.

Management controller 152 may be implemented, for example, using a system on a chip or other type of independently operating computing device (e.g., independent from the in-band components, such as hardware resources 150, of a host data processing system 100A). Management controller 152 may provide various management functionalities for data processing system 100A. For example, management controller 152 may monitor various ongoing processes performed by the in-band component, may manage power distribution, thermal management, and/or other functions of data processing system 100A.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Information provided to the application by management controller 152 may include, for example, instructions for implementation of computer-implemented services desired by users of data processing system 100A.

To facilitate communication with other devices, data processing system 100A may include network module 160. Network module 160 may provide communication services for in-band components and out-of-band components (e.g., management controller 152) of data processing system 100A.

To provide the above-described functionalities, network module 160 may include traffic manager 162, interfaces 164, and may host an instance of a TCP/IP stack to facilitate communication with other devices independently of any of the in-band components (e.g., does not rely on any hosted software, hardware components, etc.). Accordingly, compromise of any of hardware resources 150 and hosted component may not result in indirect compromise of network module 160, management controller 152, and entities hosted by management controller 152.

Management controller 152 may be operably connected to communication components of data processing system 100A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

Traffic manager 162 may include functionality to (i) discriminate traffic directed to various network endpoints advertised by data processing system 100A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 100A may appear to be two independent network entities, that may independently addressable, and otherwise unrelated to one another.

Network module 160 may utilize the instance of the TCP/IP stack to allow hardware resources 150 and/or management controller 152 to communicate with other devices via packet switched networks and/or other types of communication networks.

To facilitate management of data processing system 140 over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 100A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, management controller 152 may perform all, or a portion, of the methods and operations described in FIGS. 2A-2C.

While illustrated in FIG. 1B with a limited number of specific components, a system may include additional, fewer, and/or different components without departing from embodiments disclosed herein.

To further clarify embodiments disclosed herein, an interaction diagram in accordance with an embodiment is shown in FIGS. 2A-2C. The interaction diagrams may illustrate examples of how data may be obtained and used within the systems of FIGS. 1A-1B.

In the interaction diagram, processes performed by and interactions between components of a system in accordance with an embodiment are shown. In the diagram, components of the system are illustrated using a first set of shapes (e.g., 152, 160, etc.), located towards the top of each figure. Lines descend from these shapes. Processes performed by the components of the system are illustrated using a second set of shapes (e.g., 206, 216) superimposed over these lines.

Interactions (e.g., communication, data transmissions, etc.) between the components of the system are illustrated using a third set of shapes (e.g., 202, 204, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 202 may occur prior to the interaction labeled as 204. However, it will be appreciated that the processes and interactions may be performed in different orders, any may be omitted, and other processes or interactions may be performed without departing from embodiments disclosed herein.

Some of the lines descending from the first set of shapes are interrupted with line breaks. The line breaks may indicate, for example, a passage of time (e.g., between interactions and/or processes occurring above the line break and below other interactions and/or processes occurring below the line break), during which activity and/or events may occur.

The processes shown in FIGS. 2A-2C may be performed by any entity shown in the systems of FIGS. 1A-1B (e.g., a device similar to one of data processing system 100A, a server similar to server 102, etc.) and/or another entity without departing from embodiments disclosed herein.

Turning to FIG. 2A, a first interaction diagram in accordance with an embodiment is shown. The first interaction diagram may illustrate processes and interactions that may occur during managing operation of a data processing system. For example, data processing system 100 may include a portable device that may provide computer-implemented services. As discussed with respect to FIGS. 1A-1B, data processing system 100 may include hardware resources 150, management controller 152, and network module 160. Over time, management controller 152 may obtain location data usable to obtain a physical location of data processing system 100 and may obtain second location data usable to obtain a physical location of auxiliary device 102A. Management controller 152 may identify a security policy to implement update operations of data processing system 100 based on at least a distance determined between data processing system 100 and auxiliary device 102A which may include obtaining location data for data processing system 100 and auxiliary device 102A.

Turning to FIG. 2A, a first interaction diagram in accordance with an embodiment is shown. The first interaction diagram may illustrate processes and interactions that may occur during identification of security policies for a data processing system based on at least location data.

To perform identification of security policies, location data for the data processing system and an authentication device (e.g., device with authority to provide authentic information required to use and/or access the data processing system) may be obtained. For example, auxiliary device 102A may act as an authentication device for data processing system 100 by providing location-based authentication for unrestricted and/or unlimited operation of data processing system 100.

At interaction 202, first location data may be provided to management controller 152 by network module 160. For example, the first location data may be generated and provided to management controller 152 via (i) transmission via a message, (ii) storing in a storage with subsequent retrieval by management controller 152, (iii) via a publish-subscribe system where management controller 152 subscribes to updates from network module 160 thereby causing a copy of the first location data to be propagated to management controller 152, and/or via other processes. By providing the first location data to management controller 152, management controller 152 may receive the first location data for the data processing system 100 in order to perform geolocation analyzation processes.

The first location data may be obtained based on a myriad of events occurring such as a request for the first location data being obtained by network module 160, an automatic schedule triggering network module 160 to obtain the first location data, etc. For example, a first location request may be provided to network module 160 by management controller 152. The first location request may prompt network module 160 to obtain the first location data for data processing system 100A (e.g., using a wireless wide area network (WWAN) connection facilitated by interfaces 164 of network module 160). Network module 160 may obtain the first location data in response to the first location request, which may include location data (e.g., coordinates, timestamp information, etc.) indicating a recent or current physical location for data processing system 100. The first location data may include a first type of location data obtained using, for example, global navigation satellite systems (e.g., global positioning system).

At interaction 204, second location data may be provided to management controller 152 by auxiliary device 102A. For example, the second location data may be generated and provided to management controller 152 via (i) transmission via a message, (ii) storing in a storage with subsequent retrieval by management controller 152, (iii) via a publish-subscribe system where management controller 152 subscribes to updates from auxiliary device 102A thereby causing a copy of the second location data to be propagated to management controller 152, and/or via other processes. By providing the second location data to management controller 152, management controller 152 may receive the second location data for the data processing system 100 in order to perform geolocation analyzation processes.

Similarly, to obtaining the first location data, management controller 152 may obtain second location data based on various trigger conditions such as providing requests for the second location data to auxiliary device 102A, based on time-schedule triggering the event of obtaining the second location data from auxiliar device 102A, etc. For example, a second location request may be provided to auxiliary device 102A by management controller 152. The second location request may include a request to obtain location data (e.g., indicating a location of auxiliary device 102A) from a different source, for example, cell towers (e.g., via cell tower triangulation). Auxiliary device 102A may obtain the second location data in response to the second location request, which may include location data (e.g., coordinates, timestamp information, etc.) indicating a recent or current physical location for auxiliary device 102A. The second location data may include a second type of location data obtained using, for example, network-based location systems (e.g., Wi-Fi, cell tower triangulation, etc.).

The second location data may be provided to management controller 152 from auxiliary device 102A, for example, by using an out-of-band communication channel (e.g., channel 172 shown in FIG. 1B).

Once received, management controller 152 may utilize the first location data and the second location data to perform geolocation differential process 206. During geolocation differential process 206, the first location data and the second location data may be subjected to any type of comparison process to determine a distance between data processing system 100 and auxiliary device 102A. The distance may include a difference between the physical location of data processing system 100 and the physical location of auxiliary device 102A. For example, management controller 152 may utilize the first location data and the second location data to determine the data processing system 100 is 1.5 meters of distance from the auxiliary device 102A.

As part of geolocation differential process 206, the determined distance may be utilized by management controller 152 to identify a security policy that regulates the operation of the data processing system according to the distance between data processing system 100 and auxiliary device 102. To identify the security policy, management controller 152 may compare the determined distance to a threshold (e.g., maximum distance) defined by each of the security policies for data processing system 100 that when met may indicate the security policy in which data processing system 100 is subjected to. For example, a first level security policy may indicate that the threshold (e.g., maximum distance) between data processing system 100 and auxiliary device 102A is 1.5 meters. Therefore, if the determined distance between data processing system 100 and auxiliary device 102A is 1.5 meters or less, then data processing system 100 may be subjected to the first level security policy.

Security policies for data processing system 100 may be accessible by management controller 152 via obtaining the policies from storage, from an external device, etc. The security policies may indicate increasing levels of restriction on the operation of data processing system 100 based on the distance between data processing system 100 and auxiliary device 102A. For example, as the proximity of auxiliary device 102A to data processing system 100 decreases (e.g., distance between auxiliary device 102 and data processing system 100 increases), the restrictions to operate data processing system 100 may increase based on the security policy corresponding to the determined proximity.

Once identified, management controller 152 may utilize the security policy to cooperatively perform action set performance process 208. During action set performance process 208, management controller 152 may attempt to perform the action set specified by the security policy including utilizing hardware resources 150 to do so. For example, management controller 152 may: (i) read the security policy (e.g., identified via geolocation differential process 206), (ii) identify an action set to be performed, (iii) perform the identified action set by using at least a side band channel (e.g., side band channel 222) to communicate instructions from management controller 152 to hardware resources 150, and/or (iv) perform other methods.

As described above, the action set to be performed (e.g., during action set performance process 208) may be specified by the security policy corresponding to the distance between data processing system 100 and auxiliary device 102A. To provide further clarification, the following examples may illustrate various action sets that may be performed based on different distances between data processing system 100 and auxiliary device 102A.

In a first example, management controller 152 may identify a first level security policy (e.g., with a threshold of 1.5 meters in distance) based on a determination that the distance between data processing system 100 and auxiliary device 102A is 1.0 meters apart. Management controller 152 may read the first level security policy and identify the action set to be performed includes obscuring at least a portion of information displayed on a display by data processing system 100 to prevent unauthorized access to the portion of the information. For example, management controller 152 may restrict visual access of sensitive information by blacking out (e.g., depowering, modifying a frame buffer so that black screen is displayed, etc.) the visual display of data processing system 100, obfuscating (e.g., pixelating) portions of information shown on the display, and/or information that may be otherwise conveyed via a screen being prevented from being conveyed via the display.

As a secondary example, management controller 152 may identify a second level security policy (e.g., with a threshold of 5.0 meters in distance) based on a determination that the distance between data processing system 100 and auxiliary device 102A is 3.5 meters apart. Management controller 152 may read the second level security policy and identify the action set to be performed includes initiating a system level lock to user access of data processing system 100 which may require that a user re-enter at least a portion of previously provided security information to regain use of data processing system 100. For example, management controller 152 may restrict use of access to data processing system 100 via locking the display of data processing system 100 and thereby, requiring the user of data processing system 100 to re-enter the security information (e.g., specified for the authorized user of data processing system 100) in order to unlock the display of data processing system 100.

As a third example, management controller may identify a third level security policy (e.g., with a threshold of 15 meters in distance) based on a determination that the distance between data processing system 100 and auxiliary device 102A is 12 meters apart. Management controller 152 may read the third level security policy and identify the action set to be performed includes, at least, temporarily suspending operation of data processing system 100. For example, management controller 152 may restrict all operations of data processing system 100 by providing instructions to hardware resources 150 (e.g., startup management entity of data processing system, trusted platform module, etc.) to limit all access and/or operation of data processing system 100 (at least temporarily). The operation of data processing system 100 may be suspended until at least another security policy is enacted (e.g., based at least in part on decreasing distance between data processing system 100 and auxiliary device 102A), security resolution procedures (e.g., set by an administrator and/or authorized user of data processing system) are met, and/or by any other methods.

While illustrated in FIG. 2A as including a single network module, it may be appreciated that data processing system 100 may include separate network modules that may be used by separate components of data processing system 100. For example, out-of-band communications may be obtained by a first network module and in-band communications may be obtained by a second network module. The encrypted location reports may be aggregated from these separate network modules, or they may come from one network module via the out-of-band communication channel.

Management controller 152 may complete action set performance process 208 by, for example, cooperatively performing actions indicated by instructions included in the identified security policy that may update operation of and/or configuration settings of data processing system 100 when providing the computer-implemented services.

Thus, as shown in the example of FIG. 2A, operations of a data processing system may be managed based on security policies enacted based on physical proximity of an authentication device using out-of-band methods. For example, the distance between the data processing system and the authentication device (e.g., auxiliary device 102A) may be obtained using out-of-band communication channels and utilized to identify the security policy corresponding to the distance between data processing system 100 and the authentication device. By doing so, the likelihood of a malicious entity accessing data processing system 100 may be decreased by implementing a sliding scale of restrictions on use of data processing system 100 based on proximity of authentication devices to data processing system 100.

Turning to FIG. 2B, a second interaction diagram in accordance with an embodiment is shown. The second interaction diagram may illustrate example processes and interactions that may occur during multiple device authentication to manage operation of a data processing system.

To perform multiple device authentication, location data for the data processing system and multiple authentication devices (e.g., devices with authority to provide authentic information required to use and/or access the data processing system) may be obtained. For example, auxiliary device 102A and auxiliary device 102B may act as authentication devices for data processing system 100 by providing location-based authentication for unrestricted and/or unlimited operation of data processing system 100.

At interaction 210, location data may be provided to management controller 152 by network module 160. For example, the first location data may be generated and provided to management controller 152 via (i) transmission via a message, (ii) storing in a storage with subsequent retrieval by management controller 152, (iii) via a publish-subscribe system where management controller 152 subscribes to updates from network module 160 thereby causing a copy of the location data to be propagated to management controller 152, and/or via other processes. By providing the location data to management controller 152, management controller 152 may receive the location data for the data processing system 100 in order to perform geolocation analyzation processes.

At interaction 212, first device location data may be provided to management controller 152 by auxiliary device 102A. For example, the first device location data may be generated and provided to management controller 152 via (i) transmission via a message, (ii) storing in a storage with subsequent retrieval by management controller 152, (iii) via a publish-subscribe system where management controller 152 subscribes to updates from auxiliary device 102A thereby causing a copy of the first device location data to be propagated to management controller 152, and/or via other processes. By providing the first device location data to management controller 152, management controller 152 may receive the first device location data for auxiliary device 102A in order to perform geolocation analyzation processes.

At interaction 214, second device location data may be provided to management controller 152 by auxiliary device 102B. For example, the second device location data may be generated and provided to management controller 152 via (i) transmission via a message, (ii) storing in a storage with subsequent retrieval by management controller 152, (iii) via a publish-subscribe system where management controller 152 subscribes to updates from auxiliary device 102B thereby causing a copy of the second device location data to be propagated to management controller 152, and/or via other processes. By providing the second device location data to management controller 152, management controller 152 may receive the second device location data for auxiliary device 102B in order to perform geolocation analyzation processes.

Once received, management controller 152 may utilize the location data, first device location data, and the second device location data to perform geolocation differential process 216. During geolocation differential process 216, management controller 152 may identify a multi-authentication security policy to regulate the operation of data processing system 100 based at least in part on a geolocation differential between data processing system 100 and auxiliary device 102A. However, management controller 152 may be unable to identify the security policy until at least one additional factor of authentication is obtained. For example, the security policies for data processing system 100 may be keyed for both (1) a determined distance between data processing system 100 and auxiliary device 102A, and (2) location data of a second authentication device (e.g., auxiliary device 102B).

For example, as part of geolocation differential process 216, the location data (e.g., of data processing system 100) and the first device location data (e.g., for auxiliary device 102A) may be subjected to any type of comparison process to determine a distance between data processing system 100 and auxiliary device 102A. The distance may include a difference between the physical location of data processing system 100 and the physical location of auxiliary device 102A. For example, management controller 152 may utilize the location data (e.g., of data processing system 100) and the first device location data (e.g., of auxiliary device 102A) to determine a distance of 1.5 meters between data processing system 100 and auxiliary device 102A.

Once the distance is determined, management controller 152 may, as part of geolocation differential process 216, determine whether the second device location data (e.g., of auxiliary device 102A) is consistent with the first device location data (e.g., auxiliary device 102B). During geolocation differential process 216, the second device location data and the first device location data may be subjected to any type of comparison process to determine whether the second device location data is consistent with the first device location data. For example, management controller 152 may determine the location of the second device (e.g., auxiliary device 102B) is consistent with the location of the first device (e.g., auxiliary device 102A) when the difference between the second device location data and the first device location data falls within a threshold (e.g., specified by a security policy).

Once obtained, management controller 152 may utilize the determined distance between data processing system 100 and auxiliary device 102A and the factor of authentication (e.g., second device location data is determined to be consistent with first device location data) to identify the multi-authentication security policy for data processing system 100.

For example, management controller 152 may determine the distance between data processing system 100 and auxiliary device 102A to be 3.5 meters based on the location data and the first device location data. Continuing the example, management controller 152 may identify the multi-authentication security policy for data processing system 100 if both the distance and factor of authentication falls within the respective thresholds (e.g., as specified by each multi-authentication security policy).

Once the multi-authentication security policy is identified, management controller 152 may perform action set performance process 218 to implement restrictions to operations of data processing system 100 as specified by the multi-authentication security policy.

During action set performance process 218, management controller 152 may cooperatively perform an action set to update operations for data processing system 100. Continuing the above example, action set performance process 218 may include: (i) identifying, by management controller 152, that auxiliary device 102A may pose a security threat based on violation of the multi-authentication security policy, (ii) providing instructions to hardware resources 150 regarding initiate temporary security level lock for user access of data processing system 100, (iii) receiving, by management controller 152 and in response to the provided instructions, a notification of the status of performing the action set specified by the instructions, and/or (iv) other methods.

Following the action set performance process 218, at interaction 220, a notification may be provided to auxiliary device 102B by management controller 152. For example, the notification may be generated and provided to auxiliary device 102B via (i) transmission via a message, (ii) storing in a storage with subsequent retrieval by auxiliary device 102B, (iii) via a publish-subscribe system where auxiliary device 102B subscribes to updates from management controller 152 thereby causing a copy of the notification to be propagated to auxiliary device 102B, and/or via other processes. By providing the notification to auxiliary device 102B, auxiliary device 102B may receive the notification, and upon receiving the notification, auxiliary device 102B may identify potential security threats to data processing system 100.

Turning to FIG. 2C, a third interaction diagram in accordance with an embodiment is shown. The third interaction diagram may illustrate example processes and interactions that may occur during identification of security threats to a data processing system by analyzing movement of a data processing system and an auxiliary device and the distance between them.

To do so, at interaction 230, location data may be provided to management controller 152 by network module 160. For example, the location data may be generated and provided to management controller 152 via (i) transmission via a message, (ii) storing in a storage with subsequent retrieval by management controller 152, (iii) via a publish-subscribe system where management controller 152 subscribes to updates from network module 160 thereby causing a copy of the location data to be propagated to management controller 152, and/or via other processes. By providing the location data to management controller 152, management controller 152 may receive the location data for the data processing system 100 in order to perform geolocation analyzation processes.

At interaction 232, device first location data may be provided to management controller 152 by auxiliary device 102A. For example, the device first location data may be generated and provided to management controller 152 via (i) transmission via a message, (ii) storing in a storage with subsequent retrieval by management controller 152, (iii) via a publish-subscribe system where management controller 152 subscribes to updates from auxiliary device 102A thereby causing a copy of the device first location data to be propagated to management controller 152, and/or via other processes. By providing the device first location data to management controller 152, management controller 152 may receive the device first location data for auxiliary device 102A in order to perform geolocation analyzation processes.

After a period of time, management controller 152 may obtain addition location data for data processing system 100 and auxiliary device 102A.

At interaction 234, second location data may be provided to management controller 152 by network module 160. For example, the second location data may be generated and provided to management controller 152 via (i) transmission via a message, (ii) storing in a storage with subsequent retrieval by management controller 152, (iii) via a publish-subscribe system where management controller 152 subscribes to updates from network module 160 thereby causing a copy of the second location data to be propagated to management controller 152, and/or via other processes. By providing the second location data to management controller 152, management controller 152 may receive the second location data for the data processing system 100 in order to perform geolocation analyzation processes.

At interaction 236, device second location data may be provided to management controller 152 by auxiliary device 102A. For example, the device second location data may be generated and provided to management controller 152 via (i) transmission via a message, (ii) storing in a storage with subsequent retrieval by management controller 152, (iii) via a publish-subscribe system where management controller 152 subscribes to updates from auxiliary device 102A thereby causing a copy of the device second location data to be propagated to management controller 152, and/or via other processes. By providing the device second location data to management controller 152, management controller 152 may receive the device second location data for auxiliary device 102A in order to perform geolocation analyzation processes.

Management controller 152 may initiate geolocation differential process 238 based on the location data, device first location data, the second location data, and the device second location data. For example, management controller 152 may analyze the physical location of data processing system 100 and auxiliary device 102A over a period of time as well as determining the distance (e.g., based on the obtained location data) between data processing system 100 and auxiliary device 102A over a period of time.

During geolocation differential process 238, management controller 152 may identify distance between data processing system 100 and auxiliary device 102A over a period of time based on location data obtained for both data processing system 100 and auxiliary device 102A. To identify the distance over a period of time, management controller 152 may: (i) compare the location data (e.g., for data processing system 100) to the device first location data (e.g., for auxiliary device 102A) to determine a first distance between data processing system 100 and auxiliary device 102A at a first point in time, (ii) compare the second location data to the device second location data to determine a second distance between data processing system 100 and auxiliary device 102A at a second point in time, and/or (iii) compare the first distance and the second distance to determine a difference (if any) in the proximity of auxiliary device 102A to data processing system 100.

In addition to monitoring the distance between data processing system 100 and auxiliary device 102A, management controller 152 may, as part of geolocation differential process 238, analyze the movement (e.g., change in physical location) of data processing system 100 and auxiliary device 102A based on the locations of data processing system 100 and auxiliary device 102A.

For example, management controller 152 may identify the location of data processing system 100 to be in a stationary vehicle parked outside of a restaurant based on the location data (e.g., obtained via interaction 230) and may identify the location of auxiliary device 102A to be in the restaurant (e.g., in possession of the user) based on the device first location data (e.g., obtained via interaction 232). After a period of time, management controller 152 may identify the location of data processing system 100 to be moving down a street located a couple blocks away from the restaurant based on the second location data (e.g., obtained via interaction 234) and may identify the location of auxiliary device 102A to be in the restaurant with the user. Management controller 152 may identify a security policy to implement for data processing system 100 based on determining both the movement of the devices (e.g., data processing system 100 and auxiliary device 102) and the distance between the devices over a period of time.

Following geolocation differential process 238 and based on identifying the movement of data processing system 100 while auxiliary device 102A remains stationary, management controller 152 may initiate action set performance process 240. During action set performance process 240, management controller 152 may cooperatively perform an action set to update the operations of data processing system 100. Continuing the above example, action set performance process 240 may include: (i) identifying, by management controller 152, that data processing system 100 may pose a security threat, (ii) providing instructions to hardware resources 150 regarding suspension of operation of data processing system 100, (iii) receiving, by management controller 152 and in response to the provided instructions, a notification of the status of performing the action set specified by the instructions, and/or (iv) other methods.

After action set performance process 240, at interaction 242, a notification may be provided to auxiliary device 102A. For example, the notification may be generated and provided to auxiliary device 102A via (i) transmission via a message, (ii) storing in a storage with subsequent retrieval by auxiliary device 102A, (iii) via a publish-subscribe system where auxiliary device 102A subscribes to updates from management controller 152 thereby causing a copy of the notification to be propagated to auxiliary device 102A, and/or via other processes. By providing the notification to auxiliary device 102A, auxiliary device 102A may receive the notification, and upon receiving the notification, auxiliary device 102A may identify potential security threats to data processing system 100.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2C may perform various methods to improve secure operations of data processing systems using location data obtained via out-of-band communication methods. By utilizing location data, an out-of-band component of data processing systems may be able to implement security policies corresponding to the proximity of data processing system to trusted device(s)

in a timely manner and thereby, may decrease the likelihood of unauthorized access and/or operation of data processing systems.

FIG. 3 illustrates a method that may be performed by the components of the system of FIGS. 1A-2C. In the diagram discussed below and shown in FIG. 3, any of the operations may be repeated, performed in different orders, and/or performed in parallel with or in a partially overlapping in a timely manner with other operations. The method described with respect to FIG. 3 may be performed by a data processing system and/or another device.

Turning to FIG. 3, a flow diagram illustrating a method of managing a data processing system in accordance with an embodiment is shown. The method may be performed, for example, by a data processing system, a management system, a communication system, a management controller, hardware resources, and/or other components illustrated in FIGS. 1A-2C.

At operation 300, first location data for a data processing system may be obtained. The first location data may be obtained via out-of-band channel using methods described with respect to FIG. 2A and/or by other out-of-band communication methods. For example, to avoid using any potentially unavailable hardware resources (e.g., in-band components) of the data processing system, the first location data may be obtained by a network module of the data processing system and/or may be provided (e.g., transmitted) to the management controller via the out-of-band communication channel. The first location data may indicate a location of the data processing system based on at least a global navigation satellite system.

At operation 302, second location data for an auxiliary device may be obtained. The second location data may be obtained via the out-of-band channel using methods described with respect to FIG. 2A and/or by other out-of-band communication methods. For example, to avoid using any potentially unavailable hardware resources (e.g., in-band components) of the data processing system, the second location data may be obtained by the auxiliary device of the data processing system and/or may be provided (e.g., transmitted) to the management controller via the out-of-band communication channel.

Managing operation of data processing systems may include utilizing location data from multiple trusted devices to identify a security policy corresponding to multi-device authentication for data processing systems. Therefore, managing operation of the data processing system may also include: (i) obtaining third location data for a third device, the third device being a trusted device by the data processing system, (ii) issuing, by the data processing system, a security alert for the third device, and/or (iii) other methods.

Obtaining third location data for the third device may include: (i) receiving, via the out-of-band channel, the third location data from the third device, (ii) reading the third location data from storage, and/or (iii) other methods.

At operation 304, a distance between the data processing system and the auxiliary device may be obtained using the first location data and the second location data. The distance may be obtained by: (i) performing a comparison process using the first location data and the second location data, (ii) identifying a difference between the first location data and the second location data, and/or (iii) other methods.

At operation 306, a security policy of security policies that regulate the operation of the data processing system may be identified, based at least in part on the distance. The security policy may be identified by (i) obtaining a threshold for comparison to the distance that when met indicates that the data processing system is subject to the security policy, (ii) comparing the distance obtained in operation 304 to the threshold to identify the security policy, and/or (iii) other methods.

At operation 308, an action set may be performed as specified by the security policy to update operations of the data processing system.

In a first example, performing the action set may include obscuring at least a portion of information displayed on a display by the data processing system to prevent unauthorized access to the portion of the information. Obscuring at least the portion of the information may include: (i) identifying at least the portion of the information to obscure based on the identified security policy, (ii) providing, to hardware resources of the data processing system and via a side-band channel, instructions to obscure the identified portion of the information from being displayed on the display of the data processing system, and/or (iii) other methods. Refer to FIG. 2A for additional details and an example of cooperatively performing the action set to obscure at least a portion of information displayed on a display by the data processing system.

In a second example, performing the action set may include initiating a system level lock to user access of the data processing system. The system level lock may require that a user re-enter at least a portion of previously provided security information to regain use of the data processing system. Initiating the system level lock may include: (i) identifying, by the management controller and using the security policy identified in operation 306, an indication of the system level lock to user access, (ii) providing, to hardware resources of the data processing system and via the side band channel, instructions to be performed as part of the system level lock to user access (at least until the security information for the user is re-entered), and/or (iii) other methods.

In a third example, performing the action set may include at least temporarily suspending operation of the data processing system. At least temporarily suspending operation of the data processing system may include: (i) identifying, by the management controller and using the security policy identified in operation 306, an indication to suspend operation of the data processing system, (ii) providing, to the hardware resources and via the side band channel, instructions to be performed as part of suspending operation of the data processing system (e.g., shutting down operation of one or more hardware and/or software components), and/or (iii) other methods.

Performing the action set may include issuing a security alert for the third device based on a security policy keyed to both the distance and the third location data (e.g., for the third device). Issuing the security alert for the third device may include: (i) obtaining the security alert based on the identified security policy, (iii) transmitting, via an out-of-band channel, the security alert to the third device, and/or (iv) other methods.

The method may end following operation 308.

Using the methods illustrated in FIG. 3, embodiments disclosed herein may provide systems and methods usable to manage operations of data processing systems by implementing security policies corresponding to different levels of restrictions to operate the data processing system based on location data of multiple authentication devices. By utilizing location data of trusted devices to verify proximity to the data processing system, the likelihood of unauthorized access and/or operation of the data processing system may be reduced and the likelihood of providing seamless and secure computer-implemented services by the data processing system may be increased.

Figure 4:
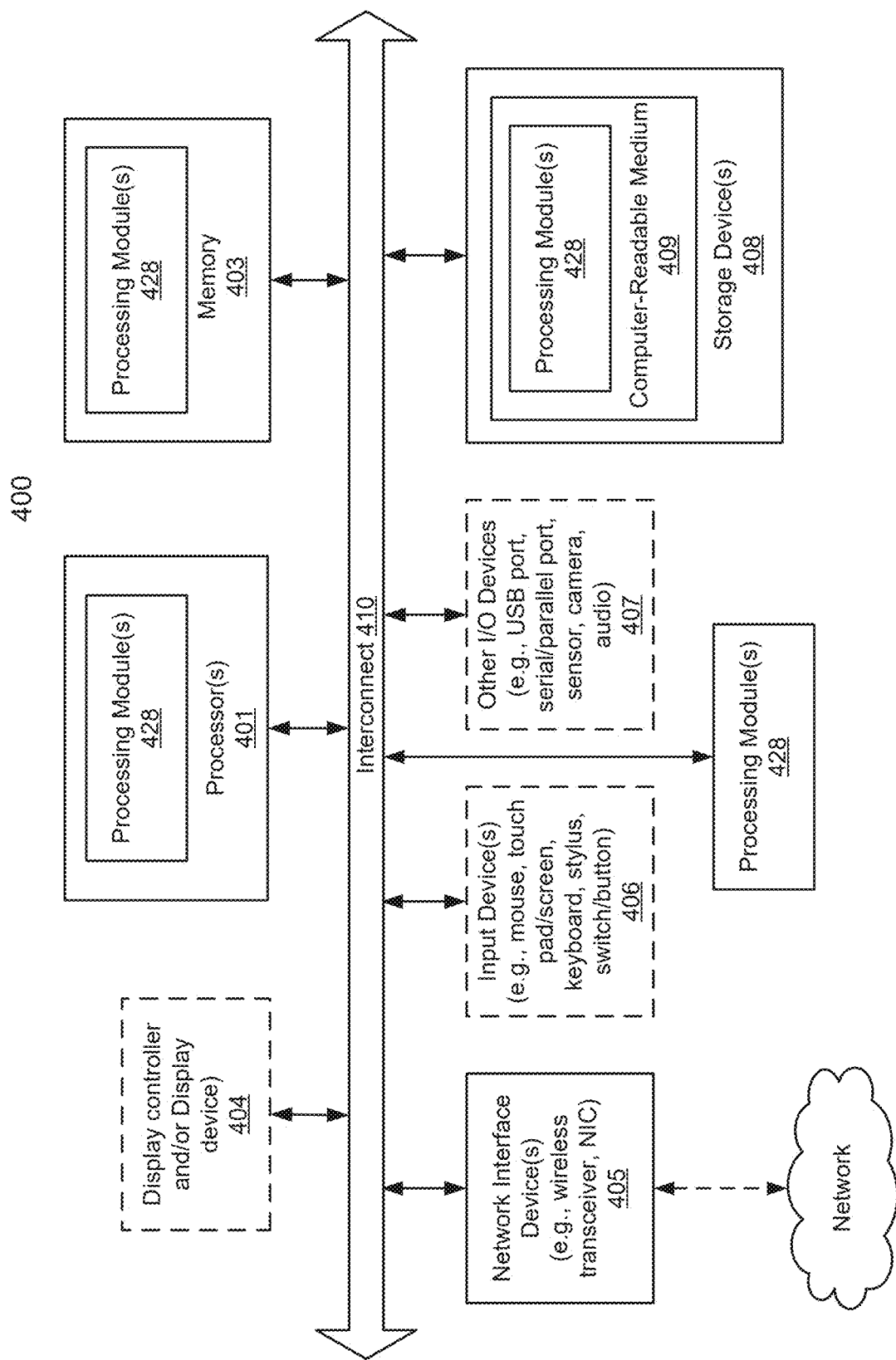
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operations of a data processing system, the method comprising:
   obtaining, by a management controller of the data processing system and via an out-of-band communication channel, first location data for the data processing system, the management controller being a first computing device that is physically installed in and operates independently from a second computing device configured as the data processing system;
   obtaining, by the management controller and via the out-of-band communication channel, second location data for an auxiliary device;
   obtaining, by the management controller, a distance between the data processing system and the auxiliary device using the first location data and the second location data;
   identifying, by the management controller, a first security policy from among a plurality of security policies that regulate the operations of the data processing system, the first security policy being identified based at least in part on the distance; and
   performing, by at least the management controller, an action set specified by the first security policy to update the operations of the data processing system.

2. The method of claim 1, wherein the plurality of security policies indicate increasing levels of restriction on the operations of the data processing system as a function of the distance.

3. The method of claim 2, wherein each of the plurality of security policies defines:
a threshold for comparison to the distance that when met indicates that the data processing system is subject to one among the plurality of security policies.

4. The method of claim 1, wherein the action set comprises:
obscuring at least a portion of information displayed on a display by the data processing system to prevent unauthorized access to the portion of the information.

5. The method of claim 1, wherein the action set comprises:
initiating a system level lock to user access of the data processing system, the system level lock requiring that a user re-enter at least a portion of previously provided security information to regain use of the data processing system.

6. The method of claim 1, wherein the action set comprises:
at least temporarily suspending the operations of the data processing system.

7. The method of claim 1, further comprising:
obtaining third location data for a third device, the third device being a trusted device by the data processing system,
wherein the first security policy is keyed to both the distance and the third location data.

8. The method of claim 7, wherein the action set comprises:
issuing, by the data processing system, a security alert for the third device.

9. The method of claim 1, wherein the first location data and the second location data are provided to the management controller by a network module of the data processing system via the out-of-band communication channel, the network module being a sole network module of the data processing system that is shared by the management controller and hardware resources of the data processing system.

10. The method of claim 9, wherein the network module is adapted to separately advertise network endpoints for the management controller and the hardware resources of the data processing system, the network endpoints being usable by a server to separately address first communications by the server to the hardware resources using an in-band communication channel and second communications by the server to the management controller using the out-of-band communication channel.

11. The method of claim 10, wherein the management controller and the network module are on separate power domains from the hardware resources so that the management controller and the network module are operable while the hardware resources are inoperable.

12. The method of claim 10, wherein the out-of-band communication channel runs through the network module, and the in-band communication channel that services the hardware resources also runs through the network module.

13. The method of claim 10, wherein the network module hosts a transmission control protocol/internet protocol (TCP/IP) stack to facilitate network communications via the out-of-band communication channel.

14. A non-transitory machine-readable medium having instructions stored therein, which when executed by a processor, cause the processor to perform first operations for managing second operations of a data processing system, the first operations comprising:
obtaining, by a management controller of the data processing system and via an out-of-band communication channel, first location data for the data processing system, the management controller being a first computing device that is physically installed in and operates independently from a second computing device configured as the data processing system;
obtaining, by the management controller and via the out-of-band communication channel, second location data for an auxiliary device;
obtaining, by the management controller, a distance between the data processing system and the auxiliary device using the first location data and the second location data;
identifying, by the management controller, a first security policy from among a plurality of security policies that regulate the second operations of the data processing system, the first security policy being identified based at least in part on the distance; and
performing, by at least the management controller, an action set specified by the first security policy to update the second operations of the data processing system.

15. The non-transitory machine-readable medium of claim 14, wherein the plurality of security policies indicate increasing levels of restriction on the second operations of the data processing system as a function of the distance.

16. The non-transitory machine-readable medium of claim 15, wherein each of the plurality of security policies defines:
a threshold for comparison to the distance that when met indicates that the data processing system is subject to one among the plurality of security policies.

17. The non-transitory machine-readable medium of claim 14, wherein the action set comprises:
obscuring at least a portion of information displayed on a display by the data processing system to prevent unauthorized access to the portion of the information.

18. A data processing system, comprising:
a processor; and
a memory coupled to the processor to store instructions, which when executed by the processor, cause the processor to perform first operations for managing second operations of a data processing system, the first operations comprising:
obtaining, by a management controller of the data processing system and via an out-of-band communication channel, first location data for the data processing system, the management controller being a first computing device that is physically installed in and operates independently from a second computing device configured as the data processing system;
obtaining, by the management controller and via the out-of-band communication channel, second location data for an auxiliary device;
obtaining, by the management controller, a distance between the data processing system and the auxiliary device using the first location data and the second location data;
identifying, by the management controller, a first security policy from among a plurality of security policies that regulate the second operations of the data processing system, the first security policy being identified based at least in part on the distance; and performing, by at least the management controller, an action set specified by the first security policy to update the second operations of the data processing system.

19. The data processing system of claim 18, wherein the plurality of security policies indicate increasing levels of restriction on the second operations of the data processing system as a function of the distance.

20. The data processing system of claim 19, wherein each of the plurality of security policies defines:
 a threshold for comparison to the distance that when met indicates that the data processing system is subject to one among the plurality of security policies.

* * * * *